(12) United States Patent
Ungaretti et al.

(10) Patent No.: US 9,201,090 B2
(45) Date of Patent: Dec. 1, 2015

(54) DETECTION CIRCUIT USING A DIFFERENTIAL CAPACITIVE SENSOR WITH INPUT-COMMON-MODE CONTROL IN A SENSE INTERFACE

(75) Inventors: Tommaso Ungaretti, Pavia (IT); Ernesto Lasalandra, S. Donato Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 2830 days.

(21) Appl. No.: 11/564,182

(22) Filed: Nov. 28, 2006

(65) Prior Publication Data
US 2007/0163815 A1 Jul. 19, 2007

(30) Foreign Application Priority Data
Nov. 29, 2005 (EP) .................... 05425842

(51) Int. Cl.
*G06F 3/044* (2006.01)
*G01P 15/125* (2006.01)
*G01P 15/13* (2006.01)

(52) U.S. Cl.
CPC ............. *G01P 15/125* (2013.01); *G01P 15/131* (2013.01)

(58) Field of Classification Search
CPC .............................. G01P 15/125; G01P 15/131
USPC .......... 73/1.37–1.39; 702/85–107; 178/18.06; 324/678; 345/173, 174
See application file for complete search history.

(56) References Cited

U.S. PATENT DOCUMENTS 4,634,965 A * 1/1987 Foote .................... G01P 15/125 324/678

5,399,980 A * 3/1995 Rashford .............. G01P 15/125 324/678

(Continued)

FOREIGN PATENT DOCUMENTS

| EP | 1 278 068 A2 | 1/2003 |
|---|---|---|
| EP | 1278068 A2 * | 1/2003 |
| WO | 2005/068959 A2 | 7/2005 |

OTHER PUBLICATIONS

Lemkin, M. et al., "A Three-Axis Micromachined Accelerometer with a CMOS Position-Sense Interface and Digital Offset-Trim Electronics," IEEE Journal of Solid-State Circuits, vol. 34, No. 4, Apr. 1999, pp. 456-468.

*Primary Examiner* — Amr Awad
*Assistant Examiner* — Aaron Midkiff
(74) *Attorney, Agent, or Firm* — Seed IP Law Group PLLC

(57) ABSTRACT

A detection circuit is provided with a differential capacitive sensor and with an interface circuit having a first sense input and a second sense input, electrically connected to the differential capacitive sensor. Provided in the interface circuit are: a sense amplifier connected at input to the first sense input and to the second sense input and supplying an output signal related to a capacitive unbalancing of the differential capacitive sensor; and a common-mode control circuit, connected to the first sense input and to the second sense input and configured to control a common-mode electrical quantity present on the first sense input and on the second sense input. The common-mode control circuit is of a totally passive type and is provided with a capacitive circuit, which is substantially identical to an equivalent electrical circuit of the differential capacitive sensor and is driven with a driving signal in phase opposition with respect to a read signal supplied to the differential capacitive sensor.

28 Claims, 2 Drawing Sheets

(56) References Cited

U.S. PATENT DOCUMENTS

| | | | |
|---|---|---|---|
| 5,992,233 A * | 11/1999 | Clark | 73/514.35 |
| 7,012,458 B1 * | 3/2006 | Roo | 327/404 |
| 7,051,590 B1 * | 5/2006 | Lemkin et al. | 73/504.04 |
| 2004/0226377 A1 * | 11/2004 | Tsugai | 73/514.32 |
| 2005/0134380 A1 * | 6/2005 | Nairn | 330/258 |

* cited by examiner

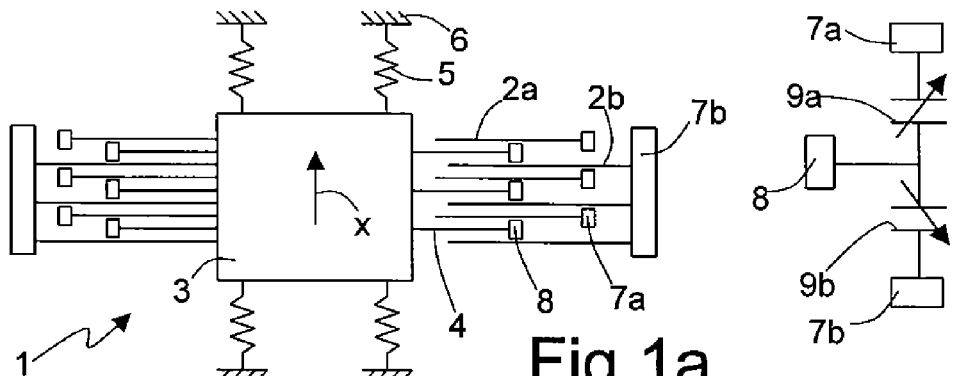
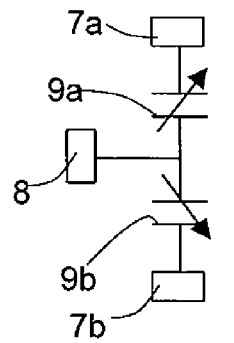
Fig. 1a (PRIOR ART)
Fig. 1b (PRIOR ART)
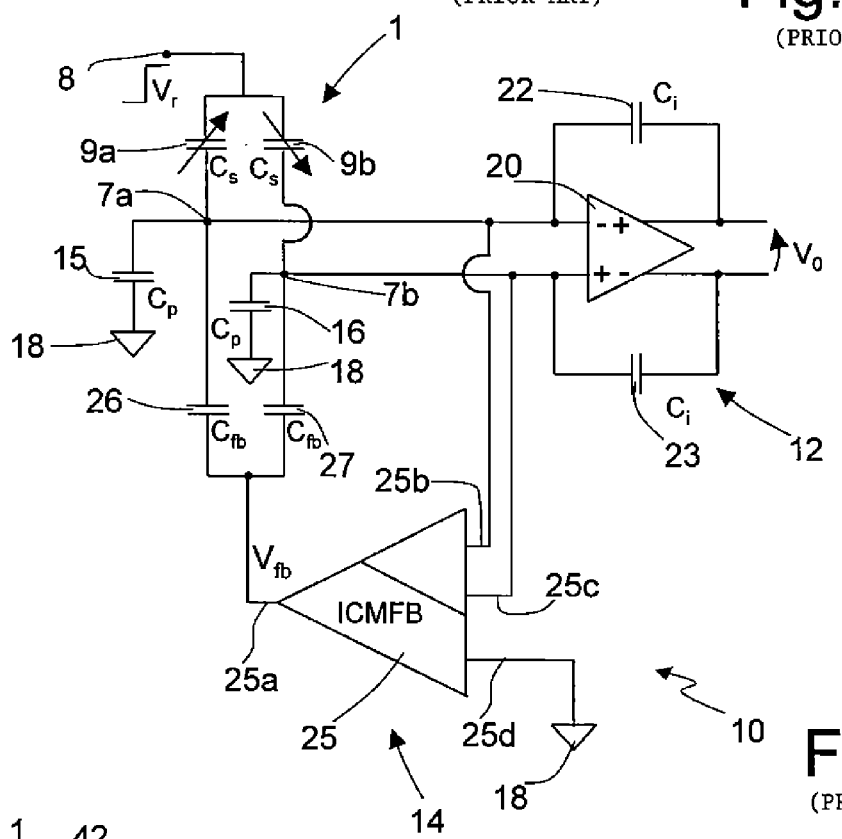
Fig. 2 (PRIOR ART)
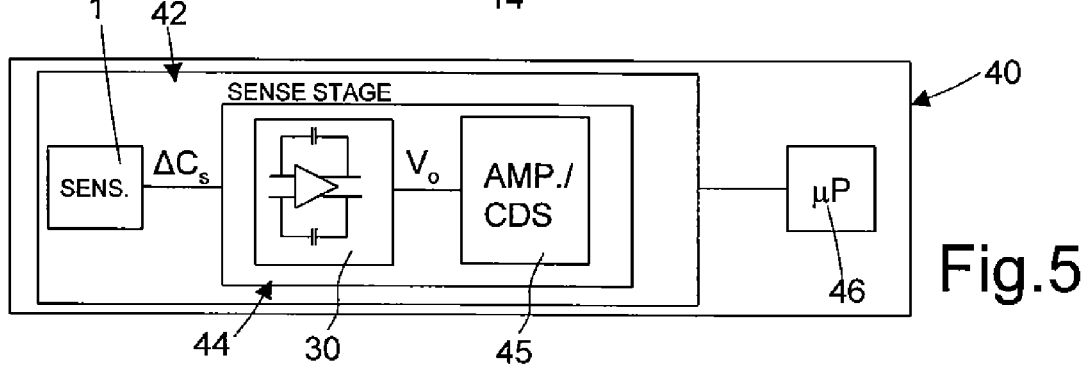
Fig. 5

DETECTION CIRCUIT USING A DIFFERENTIAL CAPACITIVE SENSOR WITH INPUT-COMMON-MODE CONTROL IN A SENSE INTERFACE

BACKGROUND OF THE INVENTION

1. Field of the Invention

The present invention relates to a detection circuit using a differential capacitive sensor with input-common-mode control in a sense interface, in particular a sense interface of the fully differential switched-capacitor type, to which the following description will make reference, without this implying any loss of generality.

2. Description of the Related Art

The last few years have witnessed a widespread use of detection circuits that employ differential capacitive sensors (for example, inertial sensors, accelerometers, pressure or force sensors) in applications that envisage low supply voltages and low power consumption, such as for example in battery-supplied portable devices (PDAs, digital audio players, cell phones, digital camcorders and the like). As is known, capacitive differential sensors base their operation on a capacitive unbalancing, which occurs as a function of a quantity to be detected (an acceleration, a pressure, a force, etc.). In particular, there is a widespread use of micro-electromechanical-system (MEMS) sensors, obtained with techniques of microfabrication of semiconductor materials. In a known way, these sensors comprise a fixed body ("stator") and a mobile mass (designated by the term "rotor"), both of which are generally made of appropriately doped semiconductor material and which are connected to one another by means of elastic elements (springs) and constrained so that the rotor has, with respect to the stator, pre-set translational and/or rotational degrees of freedom. The stator has a plurality of fixed arms, and the rotor has a plurality of mobile arms, said arms facing one another so as to form pairs of capacitors having a capacitance that varies as a function of the relative position of the arms, i.e., as a function of the relative position of the rotor with respect to the stator. Accordingly, when the sensor is affected by the quantity to be determined, the rotor shifts and a capacitive unbalancing of the pairs of capacitors occurs, from which it is possible to determine the desired quantity. According to the type of structure and the type of relative movement between rotor and stator, it is possible to provide MEMS sensors of a linear or rotational type, with variation of the gap (i.e., the distance between the mobile arms and the respective fixed arms) and/or with variation of a degree of facing (i.e., variation of the area of mutual facing between the mobile arms and the respective fixed arms).

Purely by way of example, FIG. 1a schematically illustrates a differential capacitive sensor 1, of a linear MEMS type. The following exposition is in any case to be understood as valid for MEMS sensors having different configurations. In detail, the differential capacitive sensor 1 comprises a stator, of which just the first fixed arms 2a and second fixed arms 2b are illustrated, and a rotor, constituted by a mobile mass 3 and by mobile arms 4 fixed to the mobile mass 3. Each mobile arm 4 is set between a respective first fixed arm 2a and a second fixed arm 2b. The mobile mass 3 is suspended via springs 5 to anchoring elements 6, and is mobile along an axis x that constitutes the preferential axis of detection of the differential capacitive sensor 1. The first fixed arms 2a and the second fixed arms 2b are electrically connected to a first stator terminal 7a and to a second stator terminal 7b, respectively, whilst the mobile arms 4 are electrically connected to a rotor terminal 8.

As illustrated in FIG. 1b, the differential capacitive sensor 1 has an equivalent electrical circuit comprising a first sense capacitor 9a and a second sense capacitor 9b, with plane and parallel faces, arranged in "half-bridge" configuration, i.e., connected in series between the first stator terminal 7a and the second stator terminal 7b, and having in common the rotor terminal 8. The capacitances of the first sense capacitor 9a and of the second sense capacitor 9b are variable as a function of the distance between the mobile arms 4 and the fixed arms 2a, 2b, and thus as a function of the displacement of the rotor with respect to the stator. In particular, the first sense capacitor 9a is the parallel of the capacitances formed between the first fixed arms 2a and the mobile arms 4, whilst the second sense capacitor 9b is the parallel of the capacitances formed between the second fixed arms 2b and the mobile arms 4. When the differential capacitive sensor 1 is subjected to an acceleration along the axis x, the mobile mass 3 moves along this axis, and consequently a capacitive variation of the first sense capacitor 9a and a capacitive variation of the second sense capacitor 9b are produced, said variations being equal in absolute value and opposite in sign with respect to one another. In particular, given a common sense capacitance $C_s$ at rest for the first sense capacitor 9a and the second sense capacitor 9b (assuming the differential capacitive sensor 1 as being symmetrical at rest), due to unbalancing, the first sense capacitor 9a assumes a value of capacitance equal to $C_{s1}=C_s+\Delta C_s$, and the second sense capacitor 9b assumes a value of capacitance equal to $C_{s2}=C_s-\Delta C_s$.

As is known, in the aforesaid detection circuits, an appropriate sense circuit is coupled to the differential capacitive sensor, and usually comprises a charge-integrator interface stage (or charge-amplifier, operating as charge-to-voltage converter), and appropriate stages of amplification, filtering and noise canceling, cascaded to the interface stage. The sense circuit applies a read pulse (having a voltage in the region of a few volts) to the rotor terminal, reads the resultant capacitive unbalancing $\Delta C_s$, and generates, from said capacitive unbalancing, an output electrical signal correlated to the quantity that is to be detected. In applications with low supply voltage and low consumption, the performance required to the sense circuit in terms of resolution and of thermal and long-term (aging) stability are particularly stringent, and call for the development of read techniques that are as immune as possible from error, such as noise (thermal noise and low-frequency noise) and offset. For this reason, recently-see for example the article "A Three-Axis Micromachined Accelerometer with a CMOS Position-Sense Interface and Digital Offset-Trim Electronics" by M. Lemkin, B. E. Boser, IEEE Journal of Solid-State Circuits, Vol. 34, No. 4, April 1999, pp. 456-468 which is considered included herein in its entirety— the use of fully differential sense circuits of the switched-capacitor type (operating in discrete-time) has been proposed, which make it possible to operate at low supply voltages and which intrinsically meet the need of current consumption reduction. In particular, the use in the detection circuit of differential sensors coupled to fully differential sense circuits enables numerous advantages to be obtained, amongst which: the increase in the rejection of noise coming from the supply (and/or from the substrate in case of integrated technologies); the reduction of errors, such as charge injection or the so-called "clock feedthrough" (the latter being intrinsically due to the use of switches); and the increase in the dynamics of the output signals by a factor of two. However, a problem linked to the use of fully differential circuits regards the need to eliminate or at least limit the effects due to the common-mode signal at their input. In particular, the read pulse applied to the rotor terminal (which is chosen as wide as possible compatibly with the design requirements, for the purpose of increasing the signal-to-noise ratio at the output of the sense stage) produces a common-mode signal at the inputs of the charge integrator of the interface stage. Said common-mode signal is caused by a common-mode amount of charge (i.e., an amount of charge that is the same on both of the inputs of the charge integrator) injected by the first sense capacitor 9a and by the second sense capacitor 9b following application of the read pulse. The common-mode signal must be cancelled in order to reduce the read errors that can derive therefrom, in particular a gain error and offset error depending on a mismatch of parasitic capacitances (in particular, the "pad" capacitance and substrate capacitance) at the input terminals of the charge integrator. To solve this problem, in the aforesaid article it is proposed to implement an input-common-mode control circuit of an active type, which uses a feedback loop (so-called ICMFB-Input-Common-Mode Feedback).

The above solution is now described briefly with reference to FIG. 2, which shows a detection circuit comprising an interface circuit 10, of the fully differential switched-capacitor type, coupled to the differential capacitive sensor 1, represented schematically, in accordance with what has been described previously, with the first sense capacitor 9a and the second sense capacitor 9b having sense capacitance at rest $C_s$, and having first terminals connected together and to the rotor terminal 8, and second terminals connected, respectively, to the first stator terminal 7a and to the second stator terminal 7b. The interface circuit 10 is connected at input to the first stator terminal 7a and to the second stator terminal 7b and comprises a charge integrator 12 and a feedback stage 14 implementing the ICMFB active circuit for input-common-mode control. The parasitic capacitances are represented schematically as a first parasitic capacitor 15 and a second parasitic capacitor 16, connected, respectively, between the first stator terminal 7a and the second stator terminal 7b and a reference-potential line 18 (coinciding, in particular, with the signal ground), and having parasitic capacitance $C_p$.

In detail, the charge integrator 12 comprises a sense operational amplifier 20, in charge-integrator configuration (which carries out a conversion of an input charge into an output voltage), which has an inverting input connected to the first stator terminal 7a and a non-inverting input connected to the second stator terminal 7b, and two outputs, between which an output voltage $V_o$ is present. The charge integrator 12 further comprises a first integration capacitor 22 and a second integration capacitor 23, having the same integration capacitance $C_i$ and connected the first between the inverting input and an output, and the second between the non-inverting input and the other output of the sense operational amplifier 20.

The feedback stage 14 comprises an amplifier circuit 25, and a first feedback capacitor 26 and a second feedback capacitor 27 having the same feedback capacitance $C_{fb}$. The amplifier circuit 25, the structure and operation of which are described in detail in the article referred to above, is a switched-capacitor circuit having an output 25a, a first differential input 25b and a second differential input 25c, which are connected, respectively, to the inverting input and to the non-inverting input of the sense operational amplifier 20, and a reference input 25d, connected to the reference-potential line 18. The first feedback capacitor 26 and the second feedback capacitor 27 have first terminals connected to one another and to the output 25a of the amplifier circuit 25, and second terminals connected to the first stator terminal 7a and to the second stator terminal 7b, respectively. In use, the amplifier circuit 25 detects the voltage between the first differential input 25b and the second differential input 25c, determines its mean value, and generates at the output 25a a feedback voltage $V_{fb}$ proportional to the difference between said mean value and the reference voltage of the reference-potential line 18.

Reading of the differential capacitive sensor 1 is obtained by supplying to the rotor terminal 8 (and to the mobile mass 3) a step read signal $V_r$ (which has a voltage variation having a value, for example, equal to the supply voltage of the interface circuit 10, or else equal to a fraction of said supply voltage). The charge integrator 12 integrates the differential amount of charge supplied by the first sense capacitor 9a and by the second sense capacitor 9b (i.e., caused by the capacitive unbalancing $\Delta C_s$ of the two capacitors), and consequently generates the output voltage $V_o$. In particular, the following relation of proportionality is valid for the output voltage $V_o$:

$$V_o \alpha V_r \frac{\Delta C_s}{C_i}$$

where, as mentioned previously, $\Delta C_s$ is the capacitive unbalancing of the differential capacitive sensor 1, i.e., the equal and opposite variation of capacitance of the first sense capacitor 9a and of the second sense capacitor 9b, which occurs due to displacements of the mobile mass 4 with respect to the stator. The feedback stage 14, through the feedback voltage $V_{fb}$, keeps the first stator terminal 7a and the second stator terminal 7b at a constant common-mode voltage with respect to the reference voltage. Furthermore, since the sense operational amplifier 20 keeps the voltage between its inputs substantially at zero, the first stator terminal 7a and the second stator terminal 7b are practically virtual-ground points. In this way, the influence of the parasitic capacitors 15, 16 on the sense circuit is eliminated, in so far as they are kept at a constant voltage and consequently do not absorb electric charge.

However, even though the feedback stage 14 is advantageous in so far as it enables elimination of the common-mode problems, it should be designed taking into account the requirements of low supply voltage and of low power consumption. In particular, the output dynamics of the amplifier circuit 25 should be lower than the supply voltage of the interface circuit 10; for example, it may be equal to one third of said supply voltage. It follows that the feedback capacitance $C_{fb}$ of the feedback capacitors 26, 27 should be greater than the sense capacitance at rest $C_s$ of the differential capacitive sensor 1; for example, it may be equal to three times said value, in the case where the voltage variation of the read signal $V_r$ is equal to the supply voltage. As described in the article referred to, however, the fluctuations of voltage at the input of the sense operational amplifier 20 due to the noise cause a flow of charge in the integration capacitors 22, 23, which comes both from the sense capacitors 9a, 9b and from the parasitic capacitors 15, 16, causing the noise to be amplified by a factor equal to:

$$\frac{\overline{V_o^2}}{\overline{V_{op}^2}} = \left(1 + \frac{C_s + C_p + C_{fb}}{C_i}\right)^2$$

where $V_{op}$ is the value of an equivalent input-noise generator. Consequently, it is evident from said relation that the noise at output from the charge integrator 12 increases quadratically as the value of the feedback capacitance $C_{fb}$ increases. Consequently, said value should be as contained as possible in order to reduce the output noise (or equivalently the current consumption given the same noise). The introduction of the ICMFB circuit, which itself involves a non-negligible current consumption (on account of the presence of amplifier components), although solving the problem linked to the common mode, because of the high value of the feedback capacitance $C_{fb}$ risks worsening the noise performance (or further increasing the current consumption, given the same noise) of the sense interface. The current consumption may even be excessive for portable applications.

BRIEF SUMMARY OF THE INVENTION

One embodiment of the present invention provides an interface circuit for a differential capacitive sensor that enables the aforesaid disadvantages and problems to be overcome, and in particular that will have an input-common-mode control circuit that does not jeopardize the performance in terms of current consumption and noise.

BRIEF DESCRIPTION OF THE SEVERAL VIEWS OF THE DRAWINGS

For a better understanding of the present invention, preferred embodiments thereof are now described purely by way of non-limiting example and with reference to the attached drawings, wherein:

FIG. 1a shows a schematic representation of a differential capacitive sensor of a known type;

FIG. 1b shows an equivalent electrical circuit of the sensor illustrated in FIG. 1;

FIG. 2 shows a circuit diagram of a detection circuit using the sensor illustrated in FIG. 1, which is also of a known type;

FIG. 5 shows a schematic block diagram of an electronic device equipped with a detection circuit of the type illustrated in FIG. 3 or in FIG. 4.

DETAILED DESCRIPTION OF THE INVENTION

One embodiment of the present invention envisages using, for the input-common-mode control in a sense interface of a differential capacitive sensor, a circuit of a purely passive type (accordingly defined Input-Common-Mode Passive Control-ICMPC), configured to generate a common-mode amount of charge equal in absolute value and opposite in sign to the common-mode amount of charge generated by the sensor due to application of a read pulse. In this way, a balance of common-mode charges and the value of a common-mode voltage on the input terminals of the sense interface are kept constant.

Figure 3:
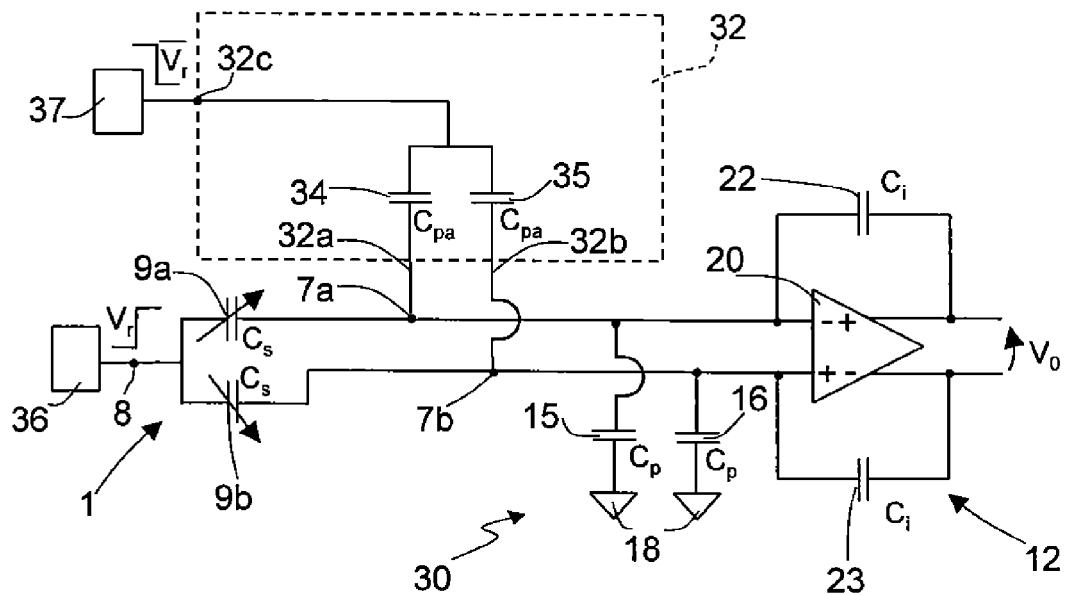
FIG. 3 shows a circuit diagram of a detection circuit according to a first embodiment of the present invention.

FIG. 3, where parts that are similar are identified with the same reference numbers used previously and are not described again in detail, illustrates a detection circuit comprising an interface circuit 30 and a differential capacitive sensor 1. In detail, the differential capacitive sensor 1 is again represented schematically with a first sense capacitor 9a and a second sense capacitor 9b, connected between a rotor terminal 8 and, respectively, a first stator terminal 7a and a second stator terminal 7b. The interface circuit 30 is connected at input to the first stator terminal 7a and to the second stator terminal 7b and comprises a charge integrator 12 and a first common-mode control circuit 32, of a purely passive (ICMPC) type. Again, parasitic capacitances at the input of the charge integrator 12 are represented schematically as a first parasitic capacitor 15 and a second parasitic capacitor 16, which are connected between the first stator terminal 7a and second stator terminal 7b, respectively, and a reference-potential line 18, and have parasitic capacitance $C_p$. The charge integrator 12 comprises: a sense operational amplifier 20, in charge-integrator configuration, connected to the first stator terminal 7a and to the second stator terminal 7b and supplying an output voltage $V_o$; and a first integration capacitor 22 and a second integration capacitor 23. The first common-mode control circuit 32 has a first output terminal 32a and a second output terminal 32b, connected to the first stator terminal 7a and second stator terminal 7b, respectively, and a driving terminal 32c.

According to one embodiment of the present invention, the first common-mode control circuit 32 is a capacitive circuit having a circuit configuration substantially identical to the equivalent electrical circuit of the differential capacitive sensor 1, and consequently comprises a first control capacitor 34 and a second control capacitor 35 having first terminals connected to one another and to the driving terminal 32c and second terminals connected, respectively, to the first output terminal 32a and to the second output terminal 32b, and having the same value of a control capacitance $C_{pa}$, in particular substantially equal to the sense capacitance $C_s$. In use, a read signal $V_r$ is supplied to the rotor terminal 8 of the differential capacitive sensor 1, via a first signal generator 36; the read signal $V_r$ being in particular a step pulse having a first voltage variation $\Delta V_r$. A driving signal $\overline{V_r}$ is supplied to the driving terminal 32c, via a second signal generator 37; the driving signal $\overline{V_r}$ also being a step pulse having a second voltage variation $-\Delta V_r$, equal and opposite (and substantially simultaneous) to the first variation $\Delta V_r$. In particular, in the case of the read signal $V_r$ having a periodic pattern (for example, a pulse train), the driving signal $\overline{V_r}$ is 180° out of phase (i.e., it is in phase opposition) with respect to the read signal $V_r$.

The first control capacitor 34 and the second control capacitor 35 consequently generate on the input terminals of the charge integrator 12 a common-mode amount of charge equal and opposite to the common-mode amount of charge generated by the first sense capacitor 9a and by the second sense capacitor 9b (in other words, the amount of charge injected/extracted by the control capacitors is equivalent to an amount of charge extracted/injected by the sense capacitors). The value of the common-mode voltage on said terminals is thus kept constant, and the contribution of the parasitic capacitances 15, 16, which, being at a constant voltage, do not absorb electrical charges, is inhibited.

Since the circuit described is based on an open-loop control, it is able to control the input common mode as long as the control capacitance $C_{pa}$ of the control capacitors 34, 35 is effectively equal to the sense capacitance $C_s$ of the differential capacitive sensor 1. Consequently, in the case where, for reasons of implementation (for example, because different technologies are used), the control capacitance $C_{pa}$ is different from the sense capacitance $C_s$, or in any case undergoes different effects of aging and of drift over time, a further embodiment of the present invention envisages using in combination with the first common-mode control circuit 32, a second common-mode control circuit 14, of an ICMFB active type, which implements a closed feedback loop.

Figure 4:
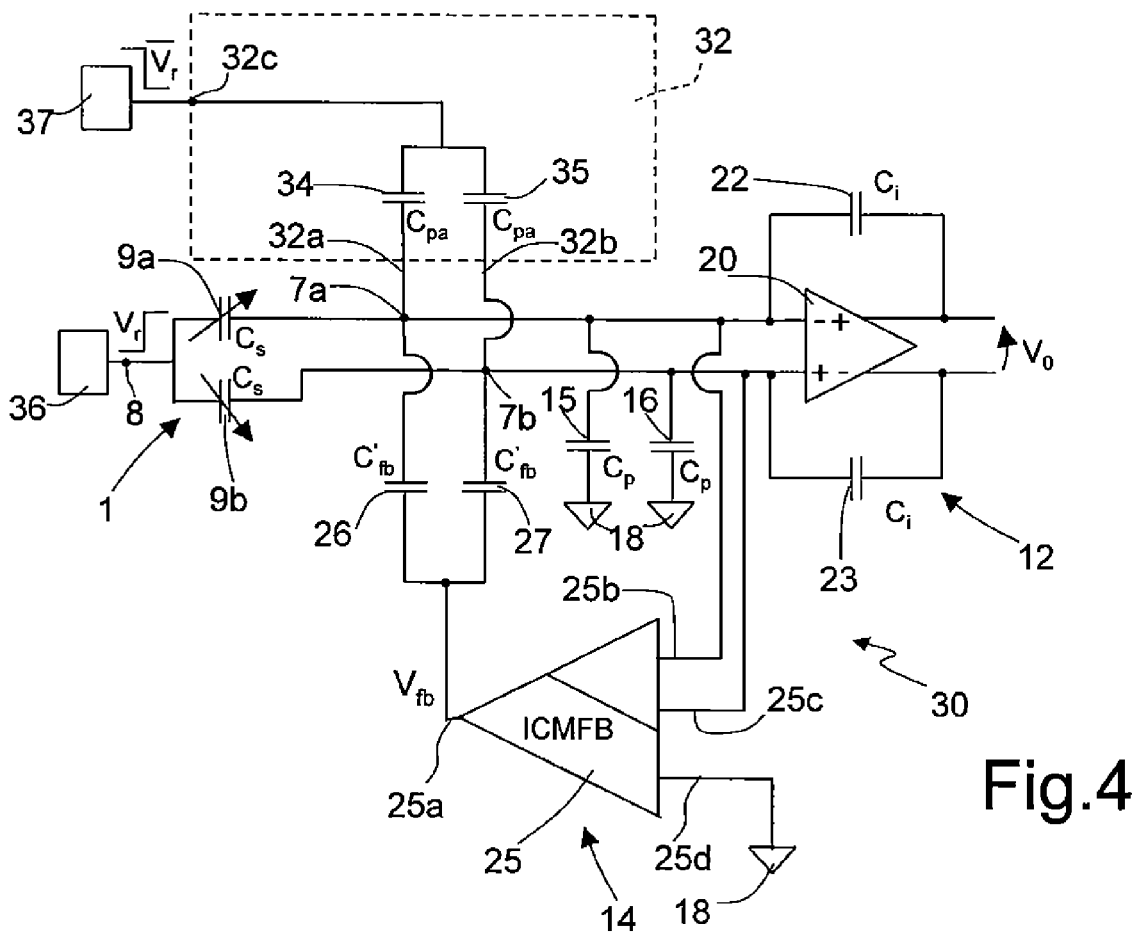
FIG. 4 shows a circuit diagram of a second embodiment of the detection circuit.

In particular (see FIG. 4), the detection circuit in accordance with a second embodiment of the present invention also comprises the second common-mode control circuit 14, which is substantially similar to the ICMFB circuit described with reference to the prior art, and consequently has an amplifier circuit 25 and a first feedback capacitor 26 and a second feedback capacitor 27, which have feedback capacitance $C_{fb}$ and are connected between an output 25a of the amplifier circuit 25 and the first stator terminal 7a, and second stator terminal 7b, respectively. However, in this case, the value of the feedback capacitance $C_{fb}$ can be much smaller than the corresponding value of the prior art, and in particular smaller than the sense capacitance $C_s$. In fact, thanks to the presence in combination of the first common-mode control circuit 32, the second common-mode control circuit 14 balances possible differences between the sense capacitance $C_s$ and the control capacitance $C_{pa}$ due to possible technological differences of fabrication, and generates small amounts of charge proportional to said differences (once again via the feedback voltage $V_{fb}$). Consequently, the current consumption and the contribution of noise of the sense interface is also in this case contained and compatible with that of portable applications.

As illustrated in FIG. 5, the interface circuit 30 described may be used to advantage in an electronic device 40. The electronic device 40 is for example a portable device, such as a mobile phone, a digital audio player, a PDA, a digital camcorder or camera, or a portable computer (laptop), and is equipped with a detection circuit 42 (in particular provided as ASIC-Application Specific Integrated Circuit), configured to determine the value of a given quantity associated to the electronic device 40 (for example, an acceleration, a pressure, a force, etc.). The detection circuit 42 comprises: a differential capacitive sensor 1 (for example an accelerometer, a pressure sensor, a force sensor, etc.), configured to sense said quantity and generate a differential capacitive variation as a function of its value; and a sense stage 44 associated to the differential capacitive sensor 1. In turn, the sense stage 44 comprises: the interface circuit 30 described previously and configured to convert the capacitive unbalancing $\Delta C_s$ into an output electrical signal $V_o$; and a gain and filtering circuit 45, for example one that uses a correlated-double-sampling (CDS) technique, configured to amplify and filter said output electrical signal, and generate a sense signal that can be used within the electronic device 40. For the purpose, the detection circuit 42 is connected at output to a microprocessor circuit 46 of the electronic device 40, configured to activate given functions of the electronic device 40 as a function of the value of the sense signal. Advantageously, according to one embodiment of the present invention, the detection circuit 42 is made in a single silicon die, so that no differences of technology of fabrication are possible between the differential capacitive sensor 1 and the sense stage 44.

The advantages of the described detection circuit are clear from the foregoing description.

In any case, it is emphasized that the circuit proposed enables a reduction in the current consumption necessary for reading of the differential capacitive sensor 1. In particular, said circuit enables a reduction in a total capacitance used for input-common-mode control and hence the noise of the system, or, equivalently, a reduction in the current consumption given the same output noise.

The first embodiment described (which envisages the use of just the passive circuit-ICMPC) has a particularly simple configuration and has an extremely low current consumption, and enables control of the common mode in the case where the sense capacitances $C_s$ are (and remain) equal to the control capacitance $C_{pa}$. For this reason, it is particularly advantageous to manufacture the differential capacitive sensor 1 with the same technology used for the interface circuit 30, in particular in one and the same silicon die.

The second embodiment is advantageous in the case where it is desired to compensate for possible differences between the aforesaid capacitances, due, for instance, to a non-uniform aging of the components. Anyway, even in the case where said embodiment is used, the value of the feedback capacitance $C_{fb}$ of the feedback capacitors 26, 27 is much smaller as compared to the prior art, with the advantage of enabling a smaller current consumption (or a lower output noise).

Finally, it is clear that modifications and variations may be made to what is described and illustrated herein, without thereby departing from the scope of the present invention, as defined in the annexed claims.

In particular, it is evident that in the detection circuit any type of differential capacitive sensor can be used, built with MEMS technology or even with different technologies. For example, the differential capacitive sensor can be a displacement sensor, a gyroscope, a linear or rotational acceleration sensor, a pressure sensor, or a force sensor.

The electronic device 40 may also be a storage device, for example a hard disk, and the detection circuit can contribute to the detection of a condition of free fall.

Furthermore, other types of waveforms can be used in reading, and the read signal $V_r$ may, for example, comprise a pulse train, or a staircase. In this regard, the first signal generator 36 and the second signal generator 37 for generation of said read signal $V_r$ (and of the corresponding driving signal in phase opposition of the ICMPC control circuit) can be obtained with any known technique, and in particular, in a known way which is not described in detail herein, by means of switches connected to lines at reference potentials.

The value of the control capacitance $C_{pa}$ and the amplitude of the driving signal $\overline{V}_r$ can moreover be different, provided that they enable generation of a common-mode amount of charge such as to balance the common-mode amount of charge generated by the differential capacitive sensor; for example, the value of the control capacitance $C_{pa}$ could be twice the sense capacitance $C_s$ (at the expense, however, of a certain increase in the output noise), and the variation of the driving signal $\overline{V}_r$ could have a value equal to one half of the corresponding variation of the read signal. In this case, the first common-mode ICMPC control circuit operates correctly as long as a ratio between the values of the control capacitance and the sense capacitance is kept at a design value.

Finally, as mentioned, the interface circuit is of the switched-capacitor type, and so switches (in a known way which is consequently not described herein) are envisaged and controlled in an appropriate way to enable biasing and reading operations.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A detection circuit, comprising:
   a differential capacitive sensor having first and second outputs and configured to provide on the first and second outputs a common-mode electrical quantity; and
   an interface circuit having a first sense input and a second sense input electrically connected to the first and second output of said differential capacitive sensor to receive said common-mode electrical quantity, said interface circuit including:
   a sense amplifier having first and second inputs respectively coupled to said first sense input and said second sense input, the sense amplifier being configured to supply an output signal related to a capacitive unbalancing of said differential capacitive sensor; and a totally passive first common-mode control circuit connected to said first sense input and said second sense input, and configured to control the common-mode electrical quantity present on said first sense input and said second sense input, wherein said first common-mode control circuit comprises generating means for generating and providing to the first and second sense inputs, in response to a drive signal, a balancing electrical quantity such as to balance said common-mode electrical quantity; said balancing electrical quantity being substantially equal in absolute value and opposite in sign to said common-mode electrical quantity.

2. The detection circuit according to claim 1, wherein said balancing electrical quantity is such as to maintain substantially constant a common-mode voltage present on said first input and said second input of the sense amplifier; said common-mode electrical quantity being a common-mode amount of charge, and said balancing electrical quantity being an amount of charge equal in absolute value and opposite in sign to said common-mode amount of charge.

3. The detection circuit according to claim 1, wherein:
said differential capacitive sensor includes a read input, a first sense capacitor coupled between the read input and the first output of the differential capacitive sensor, and a second sense capacitor coupled between the read input and the second output of the differential capacitive sensor; and
said generating means comprises a driving terminal configured to receive the driving signal, a first control capacitor coupled between the driving input and the first sense input, and a second control capacitor coupled between the driving input and the second sense input.

4. The detection circuit according to claim 3, wherein said driving signal has control amplitude variation that is substantially equal in absolute value, opposite in sign, and substantially simultaneous to a read amplitude variation of a read signal provided simultaneously to the first and second sense capacitors via the read input.

5. The detection circuit according to claim 3, wherein said first and second sense capacitors have a capacitance at rest in common and are configured to respectively have first and second capacitance changes during sensing that are equal in absolute value and opposite in sign; said common-mode electrical quantity being generated by said first sense capacitor and said second sense capacitor in response to a read signal at the read input.

6. The detection circuit according to claim 5, wherein said differential capacitive sensor comprises a micro-electromechanical sensor having a fixed body and a mobile body, free to move with respect to said fixed body as a function of said quantity to be detected, said read terminal being electrically connected to said mobile body, said first sense input and said second sense input being electrically connected to said fixed body.

7. The detection circuit according to claim 5, wherein said first control capacitance and said second control capacitance have a control capacitance value correlated to said capacitance at rest of said first sense capacitor and said second sense capacitor.

8. The detection circuit according to claim 7, wherein said control capacitance value is substantially equal to said capacitance at rest of said first sense capacitor and said second sense capacitor.

9. The detection circuit according to claim 1, further comprising an active second common-mode control circuit provided with a feedback loop; said feedback loop being configured to generate a feedback voltage of a value such as to contribute to controlling said common-mode electrical quantity.

10. The detection circuit according to claim 9, wherein said feedback loop comprises:
feedback-amplifier means connected at input to said first sense terminal and second sense terminal and having an output configured to generate said feedback voltage; and
first and second feedback capacitances connected between said output and, respectively, said first sense input and said second sense input.

11. The detection circuit according to claim 10, wherein said differential sensor includes sense-capacitor means for sensing motion, the sense-capacitor means having a capacitance at rest; and said first and second feedback capacitances having a feedback capacitance which is smaller than said capacitance at rest.

12. The detection circuit according to claim 10, wherein said first common-mode control circuit comprises control-capacitor means having a control capacitance value that differs from said capacitance at rest by an implementation difference; and wherein said first and second feedback capacitances have a feedback capacitance which is a function of said implementation difference.

13. The detection circuit according to claim 1, wherein said differential capacitive sensor and said interface circuit are integrated within a same die of semiconductor material.

14. An interface circuit, for a detection circuit that includes a differential capacitive sensor, the interface circuit comprising:
a first sense input and a second sense input configured for electrical connection to said differential capacitive sensor;
a sense amplifier having first and second inputs respectively coupled to said first sense input and said second sense input, the sense amplifier being configured to supply an output signal related to a capacitive unbalancing of said differential capacitive sensor; and
a totally passive first common-mode control circuit connected to said first sense input and said second sense input, and configured to control a common-mode electrical quantity present on said first sense input and said second sense input, wherein said first common-mode control circuit comprises generating means for generating and providing to the first and second sense inputs, in response to a driving signal, a balancing electrical quantity such as to balance said common-mode electrical quantity; said balancing electrical quantity being substantially equal in absolute value and opposite in sign to said common-mode electrical quantity.

15. The interface circuit according to claim 14, wherein said balancing electrical quantity is such as to maintain substantially constant a common-mode voltage present on said first input and said second input of the sense amplifier; said common-mode electrical quantity being a common-mode amount of charge, and said balancing electrical quantity being an amount of charge equal in absolute value and opposite in sign to said common-mode amount of charge.

16. The interface circuit according to claim 14, wherein said generating means comprises a capacitive circuit having a driving terminal configured to receive the driving signal having a control amplitude variation opposite to a read amplitude variation of a read signal supplied in use to said differential capacitive sensor.

17. The interface circuit according to claim 14, further comprising an active second common-mode control circuit provided with a feedback loop; said feedback loop being configured to generate a feedback voltage of a value such as to contribute to controlling said common-mode electrical quantity.

18. The interface circuit according to claim 17, wherein said feedback loop comprises:
feedback-amplifier means connected at input to said first sense terminal and second sense terminal and having an output configured to generate said feedback voltage; and
first and second feedback capacitances connected between said output and, respectively, said first sense input and said second sense input.

19. An electronic device comprising:
a processor; and
a detection circuit coupled to the processor and including:
a differential capacitive sensor having an input and differential first and second outputs;
a first signal generator coupled to provide a read signal to the input of the differential capacitive sensor; and
an interface circuit having a first sense input and a second sense input electrically connected to the first and second outputs of said differential capacitive sensor, respectively, said interface circuit including:
a sense amplifier connected at input to said first sense input and said second sense input and configured to supply an output signal related to a capacitive unbalancing of said differential capacitive sensor;
a passive first common-mode control circuit connected to said first sense input and said second sense input, and configured to control a common-mode electrical quantity present on said first sense input and said second sense input, wherein said first common-mode control circuit comprises first and second control capacitances coupled to the first and second sense inputs; and
a second signal generator configured to provide a driving signal to the first and second control capacitances, the driving signal being in phase opposition to the read signal.

20. The electronic device according to claim 19, wherein the electronic device is portable and is one of a group consisting of: a mobile phone, a digital audio player, a PDA, a digital camcorder or camera, and a portable computer.

21. The electronic device according to claim 19, wherein said first and second control capacitances are structured to produce a balancing electrical quantity that is such as to maintain substantially constant a common-mode voltage present on said first sense input and said second sense input; said common-mode electrical quantity being a common-mode amount of charge, and said balancing electrical quantity being an amount of charge equal in absolute value and opposite in sign to said common-mode amount of charge.

22. The electronic device according to claim 19, wherein said differential capacitive sensor includes first and second sense capacitors connected respectively between the input and said first sense input and said second sense input, and having a capacitance at rest in common, the first and second control capacitances having a capacitance substantially equal to the capacitance at rest.

23. The electronic device according to claim 19, further comprising an active second common-mode control circuit provided with a feedback loop; said feedback loop being configured to generate a feedback voltage of a value such as to contribute to controlling said common-mode electrical quantity.

24. The electronic device according to claim 23, wherein said feedback loop comprises:
feedback-amplifier means connected at input to said first sense terminal and second sense terminal and having an output configured to generate said feedback voltage; and
first and second feedback capacitances connected between said output and, respectively, said first sense input and said second sense input.

25. A method, comprising:
reading a differential capacitive sensor through an interface circuit provided with a first sense input and a second sense input electrically connected to said differential capacitive sensor, the reading including:
providing a read signal to an input of the differential capacitive sensor;
sensing a capacitive unbalancing of said differential capacitive sensor;
generating an output signal related to said capacitive unbalancing; and
providing a drive signal to a capacitive circuit of a passive first common-mode control circuit, the capacitive circuit controlling, in response to the drive signal, a common-mode electrical quantity produced by the differential capacitive sensor, the drive signal being in phase opposition to the read signal.

26. The read method according to claim 25, wherein the controlling comprises generating a balancing electrical quantity such as to balance said common-mode electrical quantity and to maintain substantially constant a common-mode voltage present on said first sense input and said second sense input; said common-mode electrical quantity being a common-mode amount of charge, and said balancing electrical quantity being an amount of charge equal in absolute value and opposite in sign to said common-mode amount of charge.

27. The read method according to claim 26, wherein the read signal has a read amplitude variation, and the driving signal has a control amplitude variation substantially equal and opposite to said read amplitude variation.

28. The read method according to claim 27, wherein:
said differential capacitive sensor includes a first sense capacitor coupled between the input and the first output of the differential capacitive sensor, and a second sense capacitor coupled between the read input and the second output of the differential capacitive sensor; and
said capacitive circuit includes a first control capacitor coupled between the driving input and the first sense input, and a second control capacitor coupled between the driving input and the second sense input, the first and second control capacitors each having a capacitance substantially equal to a capacitance at rest of each of the first and second sense capacitors.

* * * * *